(12) United States Patent
Abe et al.

(10) Patent No.: US 7,103,596 B2
(45) Date of Patent: Sep. 5, 2006

(54) DATA SORT METHOD, DATA SORT APPARATUS, AND DATA SORT PROGRAM

(75) Inventors: Fumirou Abe, Kawasaki (JP);
Masataka Matsuura, Kawasaki (JP);
Yoko Tabata, Kawasaki (JP);
Masahiko Nagata, Fukuoka (JP);
Yasuhisa Hara, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 511 days.

(21) Appl. No.: 10/086,696

(22) Filed: Mar. 4, 2002

(65) Prior Publication Data

US 2003/0033278 A1 Feb. 13, 2003

(30) Foreign Application Priority Data

Jul. 27, 2001 (JP) ............... 2001-227587

(51) Int. Cl.
*G06F 17/30* (2006.01)
(52) U.S. Cl. .......................... 707/7; 707/101
(58) Field of Classification Search ............. 707/1–7, 707/10, 100–102, 104.1, 200–205; 700/90, 700/213, 219, 223, 245; 382/229, 232
See application file for complete search history.

(56) References Cited

U.S. PATENT DOCUMENTS 5,138,669 A * 8/1992 Shimura et al. ............ 382/229
5,148,541 A * 9/1992 Lee et al. .................... 707/2
5,758,353 A 5/1998 Marquis
5,924,091 A * 7/1999 Burkhard ..................... 707/7
6,009,424 A * 12/1999 Lepage et al. ............... 707/6
6,745,173 B1 * 6/2004 Amundsen ................... 707/2

FOREIGN PATENT DOCUMENTS

| JP | 5/-003035 | 1/1983 |
| JP | 61-141035 | 6/1986 |
| JP | 06-139278 | 5/1994 |

OTHER PUBLICATIONS

Office Action for corresponding Japanese Application No. 2001-227587 dated Jun. 30, 2005.
Donald E. Knuth, "The Art of Computer Programming", vol. 3, Addison-Wesley, Jul. 2000, pp. 409-454.

* cited by examiner

*Primary Examiner*—Jean M. Corrielus
(74) *Attorney, Agent, or Firm*—Staas & Halsey LLP (57) ABSTRACT

A data sort method, apparatus, and program to receive a character string of sort key items specified as keys of a data sort process, generate an automaton corresponding to a record whose final transition state corresponds to the character string, determine the order specified by the character string by scanning the automaton, and determine the order of the records corresponding to the character string.

13 Claims, 9 Drawing Sheets

(A) EXAMPLE OF SETTING KEY CHARACTER STRING WHEN VALUE OF KEY ITEM IS CHARACTER STRING '富士通' (THREE JAPANESE CHARACTERS)

| | | NUMBER OF BITS OF CHARACTER UNIT | 16 | 8 | 4 |
|---|---|---|---|---|---|
| SJIS CODE 9578 OF CHARACTER '富' (ONE JAPANESE CHARACTER) | KEY CHARACTER STRING k-str  FIRST CHARACTER | | 9578 | 95 | 9 |
| | SECOND CHARACTER | | 8E6D | 78 | 5 |
| | THIRD CHARACTER | | 92CF | 8E | 7 |
| | FOURTH CHARACTER | | . | 6D | 8 |
| SJIS CODE 8E6D OF CHARACTER '士' (ONE JAPANESE CHARACTER) | FIFTH CHARACTER | | . | 92 | 8 |
| | SIXTH CHARACTER | | . | CA | E |
| | . | | . | . | . |
| SJIS CODE 92CF OF CHARACTER '通' (ONE JAPANESE CHARACTER) | MAXIMUM NUMBER OF TRANSITION STATES | | 65536 | 256 | 16 |

(B) EXAMPLE OF CONFIGURATION OF p-TH CHARACTER RECEPTION STATE TRANSITION TABLE WHEN KEY CHARACTER STRING k-str IS A 4-BIT CHARACTER

FIG. 3

(A) EXAMPLE OF STRUCTURE OF DATA d

| | |
|---|---|
| RECORD IDENTIFIER rid = 1 → | <PART CODE>15<NAME>安倍太郎(FOUR JAPANESE CHARACTERS)<br><FISCAL YEAR IN WHICH THE PERSON JOINED THE COMPANY>90<br><SALES>900<R-END> |
| RECORD IDENTIFIER rid = 2 → | <PART CODE>01<NAME>松浦一郎(FOUR JAPANESE CHARACTERS)<br><FISCAL YEAR IN WHICH THE PERSON JOINED THE COMPANY>90<br><SALES>900<R-END> |
| · | <PART CODE>15<NAME>田端花子(FOUR JAPANESE CHARACTERS)<br><FISCAL YEAR IN WHICH THE PERSON JOINED THE COMPANY>92<br><SALES>605<R-END> |
| · | <PART CODE>07<NAME>永田正夫(FOUR JAPANESE CHARACTERS)<br><FISCAL YEAR IN WHICH THE PERSON JOINED THE COMPANY>95<br><SALES>850<R-END> |
| · | <PART CODE>02<NAME>原裕太(THREE JAPANESE CHARACTERS)<br><FISCAL YEAR IN WHICH THE PERSON JOINED THE COMPANY>97<br><SALES>605<R-END> |
| RECORD IDENTIFIER rid = Rmax | ············<R-END>     EOF |

(B) EXAMPLE OF SETTING KEY CONDITION kc

| KEY PRIORITY | 1 | 2 | 3 |
|---|---|---|---|
| KEY ITEM NAME | <SALES> | <FISCAL YEAR IN WHICH THE PERSON JOINED THE COMPANY> | <PART CODE> |
| SORT MODE | DESCENDING ORDER | ASCENDING ORDER | ASCENDING ORDER |
| DATA TYPE | TYPE = NUMBER<br>0 SUPPRESS CAN BE SET<br>DECIMAL NUMBER CAN BE SET<br>POSITIVE/NEGATIVE SIGN CAN BE SET<br>ARGUMENT INDEX REPRESENTATION CAN BE SET<br>SPACE INSERTION CAN BE SET<br>FULL/HALF SIZE CHARACTERS CAN COEXIST | TYPE = NUMBER<br>0 SUPPRESS CANNOT BE SET<br>DECIMAL NUMBER CANNOT BE SET<br>POSITIVE/NEGATIVE SIGN CANNOT BE SET<br>ARGUMENT INDEX REPRESENTATION CANNOT BE SET<br>SPACE INSERTION CANNOT BE SET<br>FULL/HALF SIZE CHARACTER CANNOT COEXIST | TYPE = CHARACTER STRING |
| MAXIMUM NUMBER OF CHARACTERS | 10 | — | — |

(C) EXAMPLE OF PRE-PROCESSING KEY DATA BASED ON KEY CONDITION kc

| KEY CONDITION kc | KEY DATA | INPUT CHARACTER STRING | KEY CHARACTER STRING k-str | NUMBER OF CHARACTERS |
|---|---|---|---|---|
| TYPE = CHARACTER STRING | -123.456 | x2D3132332E343536 | x2D3132332E343536 | 16 |
| TYPE = NUMBER | 2<br>15<br>03<br>-123.456 | x32<br>x3135<br>x3033<br>x2D3132332E343536 | xC0000002<br>xC080000F<br>xC0000003<br>x4181E240 | 8<br>8<br>8<br>8 |

INTERNAL CHARACTER STRING CHANGE SPECIFICATION OF NUMBER TYPE: FLOATING POINT FORMAT
SIGN PORTION                                    1 BIT  NEGATIVE = 0, POSITIVE = 1 (*)
INDEX PORTION      INDEX SIGN PORTION           1 BIT  NEGATIVE = 0, POSITIVE = 1 (*)
                   INDEX ABSOLUTE NUMBER        7 BITS
ARGUMENT PORTION   ARGUMENT INTEGER VALUE       23 BITS
(*) INDICATES DIFFERENCE FROM COMMON ANSI/IEEE STANDARD 754 FLOATING POINT FORMAT.

FIG. 4

(A) EXAMPLE OF DATA STRUCTURE OF ORDER VALUE TUPLE j-tpl AND PLURAL ORDER VALUE TUPLE

| RECORD IDENTIFIER rid | FIRST PRIORITY KEY ORDER VALUE jval (1) | SECOND PRIORITY KEY ORDER VALUE jval (2) | ... | K-TH PRIORITY KEY ORDER VALUE jval (K) |
|---|---|---|---|---|

(B) EXAMPLE OF STRUCTURE OF SORT ORDER SORT TABLE s-st

| ORDER VALUE jval | RECORD IDENTIFIER rid |
|---|---|
| 1 | 301 |
| 2 | 158 |
| 3 | 23 |
| 3 | 1687 |
| 5 | 14 |
| . | . |

NOTE) NORMALLY, SAME ORDER VALUE jval CAN CORRESPOND TO A PLURALITY OF RECORD IDENTIFIERS rid (C) EXAMPLE OF STRUCTURE OF RECORD ORDER SORT TABLE r-st

| RECORD IDENTIFIER rid | FIRST PRIORITY KEY | | SECOND PRIORITY KEY | | | K-TH PRIORITY KEY | |
|---|---|---|---|---|---|---|---|
| | LOST KEY FLAG | ORDER VALUE jval | LOST KEY FLAG | ORDER VALUE jval | | LOST KEY FLAG | ORDER VALUE jval |
| 1 | | 251 | | 68 | | | 106 |
| 2 | | 38 | | 497 | | | 184 |
| 3 | LOSING | max(1) | | 711 | | | 992 |
| 4 | | 574 | | 25 | | | 78 |
| 5 | | 398 | | 56 | | LOSING | max(K) |
| 6 | | 16 | LOSING | max(2) | | | 532 |
| . | . | . | . | . | | . | . |

NOTE) VALUES OF max(1), max(2), ..., max(K) ARE DETERMINED IN ORDER VALUE TUPLE GENERATING STEP

F I G. 5

(A) EXAMPLE OF OPERATIONS IN INITIALIZING STEP (STEP S11 IN FIG. 1)

RECORD IDENTIFIER SETTING UNIT 1 SETS AREA OF RECORD IDENTIFIER SETTING TABLE rid-t, AND RESETS READ RECORD NUMBER VARIABLE rr (rr ←0).
KEY DATA PRE-PROCESSING UNIT 2 READS AND STORES KEY CONDITION kc.
NUMBER OF KEY ITEMS IS OBTAINED FROM KEY DATA PRE-PROCESSING UNIT 2, AND AREA OF RECORD ORDER SORT TABLE r-st IS SET.
AREA OF SORT ORDER SORT TABLE s-st IS SET.
k-TH PRIORITY KEY INITIAL STATE TRANSITION TABLE tid-k(0) IS SET. tid-k(0) = iiii(k)

(B) EXAMPLE OF OPERATION IN RECORD IDENTIFIER SETTING STEP (STEP S14 SHOWN IN FIG. 1)

READ RECORD NUMBER VARIABLE rr←[rr] + 1 (INCREMENT).
RECORD IDENTIFIER rid←[rr], STARTING ADDRESS OFFSET VALUE, AND RECORD LENGTH ARE SET IN RECORD IDENTIFIER SETTING TABLE rid-t.
RECORD IDENTIFIER rid←[rr] IS ENTERED IN RECORD ORDER SORT TABLE r-st.

(C) EXAMPLE OF OPERATIONS IN LOST KEY PROCESSING STEP (S110 IN FIG. 1)

LOST KEY FLAG IS SET IN RECORD IDENTIFIER rid ROW OF RECORD ORDER SORT TABLE r-st.
ADDING 1 TO FINAL TRANSITION STATE FLAG COLUMN OF k-TH PRIORITY KEY INITIAL STATE TRANSITION TABLE tid-k(0), AND RECORD IDENTIFIER rid IS APPENDED TO RECEIVED RECORD IDENTIFIER LIST COLUMN.

(D) EXAMPLE OF STRUCTURE OF RECORD IDENTIFIER SETTING TABLE rid-t

| RECORD IDENTIFIER rid | STARTING ADDRESS OFFSET VALUE | RECORD LENGTH |
|---|---|---|
| 1 | 0 | 45 |
| 2 | 45 | 40 |
| 3 | 85 | 45 |
| 4 | 130 | 38 |
| 5 | 168 | 38 |
| 6 | . | . |
| . | . | . |

DATA SORT METHOD, DATA SORT APPARATUS, AND DATA SORT PROGRAM

BACKGROUND OF THE INVENTION

1. Field of the Invention

The present invention relates to the data sort technology of ordering records by comparing the values of the records corresponding to items specified as sort keys in a large amount of record data constructing a large number of records comprising a plurality of items, and more specifically to the data sort technology of character string data having a record structure in CSV (Comma Separated Value) format data and text format data such as an XML (Extensible Markup Language) document.

2. Description of the Related Art

Conventionally, data sort methods can be selection sort, insertion sort, bubble sort, Shell sort, quick sorts, etc. In these methods, a record, which is a unit for a sort, is compared individually. Therefore, it is necessary to repeatedly read the same records each time a sorting process is performed, and the time required to perform the sorting process increases in progression with an increasing number of records. Normally, assuming that the number of records is n, the time required to perform a sorting process in each method can be expressed by the following equation.

Simple selection method: n to the 2nd power
quick sort: n log n~n to the 2nd power
insertion sort: n to the 2nd power
(in case of a large number of records)
bubble sort: n~n to the 2nd power
Shell sort: n to the 1.5th power~n to the 1.25th power Thus, in the conventional data sort methods, the time required to perform the process of sorting a large amount of record data increases in progression with an increasing number of records, thereby causing the problem that the integrity and servability of data can be badly damaged.

SUMMARY OF THE INVENTION

The present invention aims at providing a data sort method, apparatus, and program capable of obtaining a desired sorting order value by reading records only once. An aspect of the present invention is a data sort method of ordering records in an ascending or descending order by specified sort key item, and is configured by: an automaton generating step of generating an automaton which accepts a character string of a sort key item of each record, and associates its final transition state with a corresponding record identifier; and an order value tuple generating step of generating an order value tuple which is a set of an order value of the records ordered in ascending or descending order by scanning the automaton with a corresponding record identifier.

BRIEF DESCRIPTION OF THE DRAWINGS

FIG. 4 shows an example of setting the structure of input data d and key condition kc;

DESCRIPTION OF THE PREFERRED EMBODIMENTS

The preferred embodiments of the present invention are described below by referring to the attached drawings.

Figure 1:
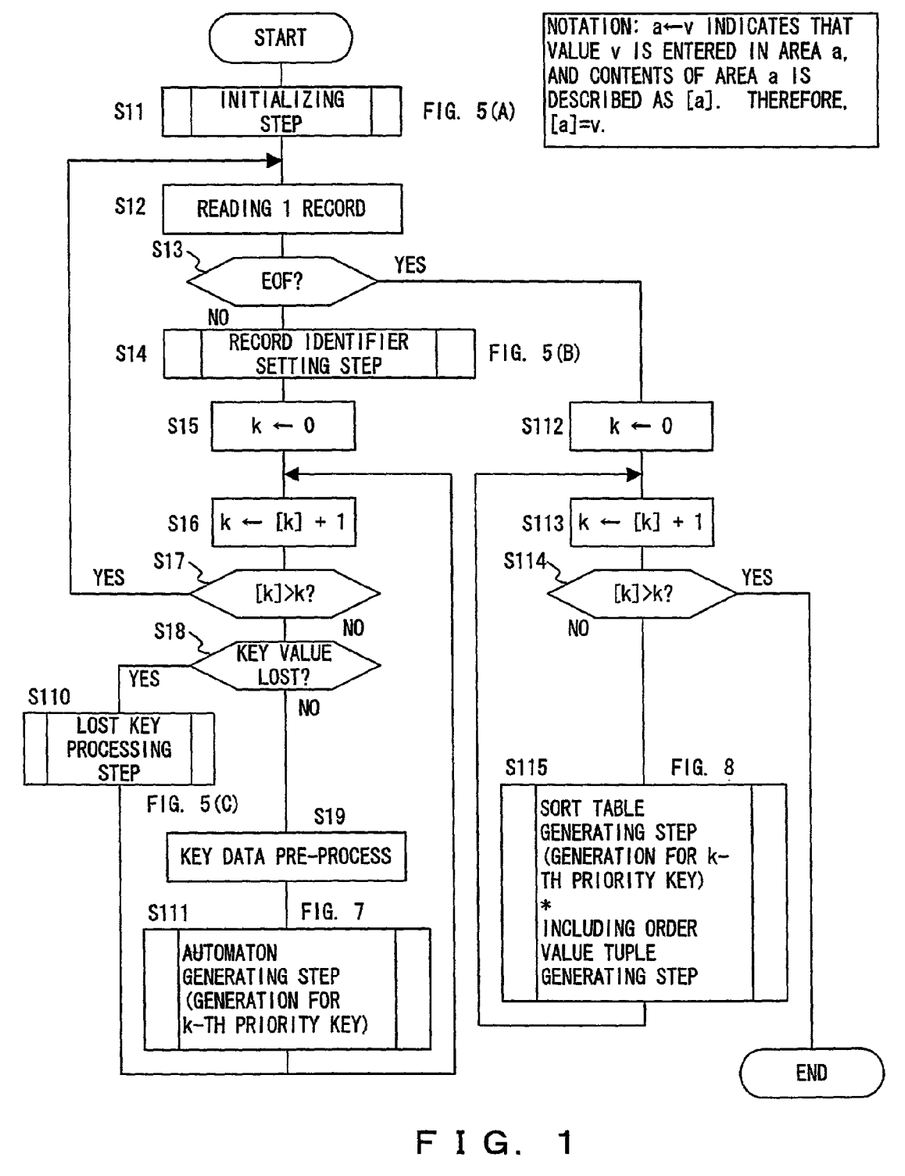
FIG. 1 shows an example of a flowchart of the operations in the data sort method according to the present invention.

As shown in FIG. 1, the present invention is realized by: an automaton generating step (step S111) of generating an automaton which accepts a character string of a sort key item of each record, and associates its final transition state with a corresponding record identifier; and an order value tuple generating step (step S115) of generating an order value tuple which is a set of an order value of the records ordered in ascending or descending order by scanning the automaton with a corresponding record identifier.

Figure 2:
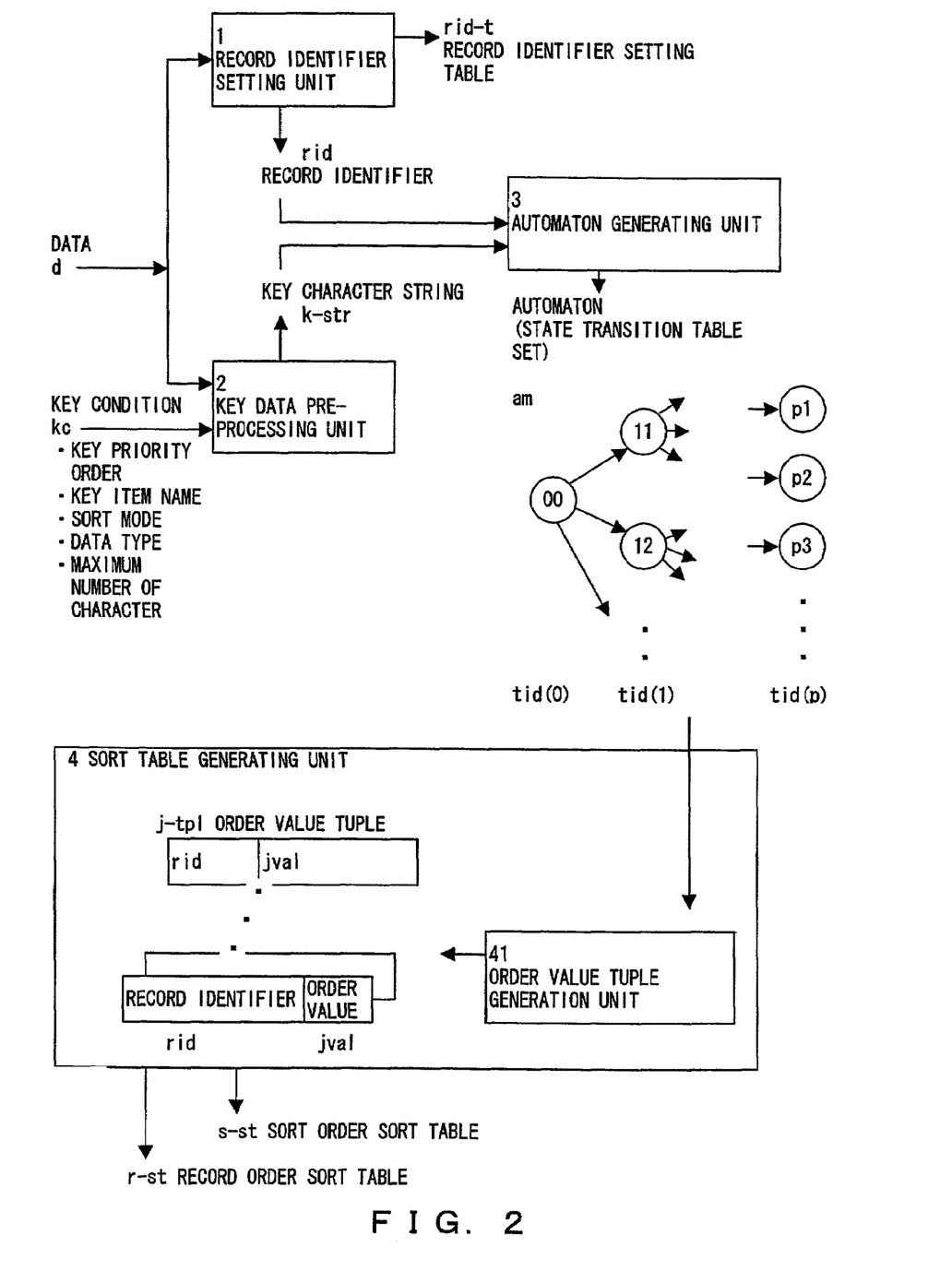
FIG. 2 is a block diagram of the function of the data sort apparatus according to the present invention.

That is, in the case of the data sort apparatus configured as shown in FIG. 2, after performing the pre-process of applying a specified key condition kc to input data d, an automaton generating unit 3 obtains a record identifier rid for identification of an input record from a record identifier setting unit 1, and obtains a key character string k-str corresponding to the value of the specified key in the record from a key data pre-processing unit 2 in step S111.

The automaton generating unit 3 generates an automaton am for reception of the key character string k-str for all records to be processed in the sorting operations. An automaton am is a set of state transition tables having hierarchical levels for characters (maximum number of digits for variable length) of the key character string k-str, and the tables are linked to one another, and form a tree structure with the initial state transition table (00) as a root as shown in FIG. 2.

In the present embodiment, the automaton am records a corresponding record identifier in the final state transition table indicating the final transition state in which each key character string k-str is received. Therefore, the record identifiers rid of all input records are recorded in any of the state transition tables.

Then, an order value tuple generation unit 41 in the sort table generating unit 4 scans the data from the root of the tree structure of the automaton am in the order of states by depth in step S115, and obtains the record identifier rid recorded in the state transition table obtained in the scanning process. At this time, the order value jval is associated with the record identifier rid in the scanning order. Thus, the order value tuple generation unit 41 can generate an order value tuple j-tpl which is a set of an order value jval and the corresponding record identifier rid. In addition, when a data sort can be completed relating to all records, the process of the order value tuple generating step in step S115 is performed, and the sort order sort table s-st in which all order value tuples j-tpl are arranged by order value jval in ascending or descending order is to be generated. If there are a plurality of sort key items specified by a key condition kc, then, for example, K automatons am are generated for each sort key item when the first, second, . . . , and K-th priority key are set. In this case, each time one record is read, the automaton generating step in step S111 is looped K times, and the K automatons am are updated and developed. After all records have been read, the sort table generating step in step S115 are also looped K times, the K automatons am are sequentially scanned, and a record order sort table r-st in which record identifiers rid are arranged in ascending or descending order is generated.

In the generated record order sort table r-st, a plurality of order value tuples structuring each of the first priority key order value jval (1), the second priority key order value jval (2), . . . , and the K-th priority key order value jval (K) are obtained for each record. Regarding the plural order value tuples j-tpl as a character string, that is, a plural order value key character string, the automaton generating unit 3 is provided with a plural order value key character string for each tuple in the record order sort table r-st, an automaton which receives them is generated (by applying step S111), and the automaton is provided for a sort table generating unit 4 for a scanning process (by applying step S115). Then, a general order value tuple which is a set of a general order value newly assigned in a general order for the plurality of sort keys and the corresponding record identifiers is generated. Therefore, in the above mentioned case, the process in step S115 corresponds to a general order value tuple generating step. From the obtained general order value tuple, a general sort order sort table s-st is obtained, thereby completing a data sort for a plurality of sort keys. Since a desired sort order value can be obtained by reading all records only once, the process speed is much higher than in the conventional technology.

Furthermore, as shown in step S14 in FIG. 1, by setting a record identifier setting step in which a tuple of associating a starting address of a record with a record identifier identifying the record is recorded for each of the records read from the input data, a record identifier rid can be assigned although there is no explicit record identifier in the data d, thereby extending an application scope of the present invention.

In addition, as shown in step S19 in FIG. 1, by setting a key data pre-processing step in which input sort key item data is converted into a key character string k-str suitable for the automaton generating process depending on the key condition kc relating to the data sort method for each of the specified sort key items, the data type and the number of digits of the sort key item data can be converted so that a sorting process can be successfully performed, thereby extending the scope of the sortable data d.

Described above is the outline of the embodiments of the present invention, and the practical examples are described in detail below.

Figure 3:
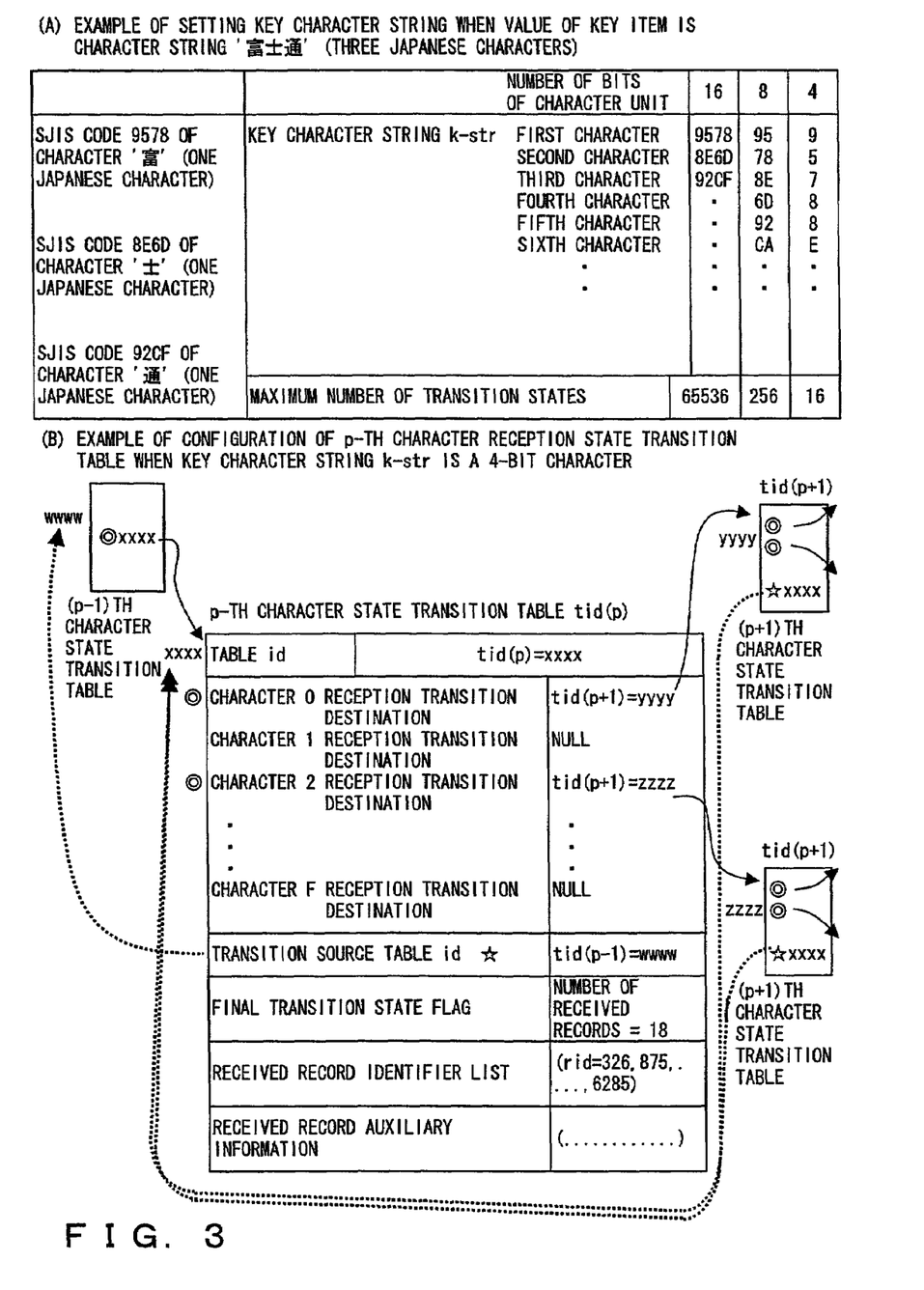
FIG. 3 shows an example of generating an automaton using a state transition table.

First, an example of the structure of an automaton, which is a central component of the present invention, is explained below by referring to a practical example shown in FIG. 3. As the automaton am is described above by referring to the tree structure shown in FIG. 2, the automaton am is a set of a plurality of state transition tables and presents the state transition by receiving a key character string k-str. That is, a state transition table is assigned to each node, and an arrow linking nodes corresponds to each character of the key character string k-str. The number of state transitions corresponds to the number of arrows linking one state transition table with another state transition table. In the automaton am, a state transition occurs depending on the type of a possible value of each character in the key character string k-str. Therefore, the number of state transitions per character in the automaton am depends on the length of the bit length per character of the key character string k-str, which is explained below with reference to FIG. 3A.

FIG. 3A shows an example of setting a key character string k-str when the value of a key item is a character string '富士通' (three Japanese characters). In this example, these Japanese characters are represented by an SJIS code, and expressed by a bit string formed by a total of 48 bits of three characters each occupying two bytes (16 bits). Assuming that the number of bits for one character (bit unit for one character) of key character string k-str is 16, the first character is represented by x9578, and the maximum transition state number per character is 65536. Similarly, assuming that the bit unit for one character is 8, the first character is x95, and the maximum transition state number per character is 256. Assuming that the bit unit for one character is 4, the first character is x9, and the maximum transition state number per character is 16. Thus, the structure of the automaton am depends on the bit unit per character of a received key character string k-str. According to the present embodiment, the bit unit per character of a key character string k-str is defined as 4, but the automaton am for receiving a character string of a key item is not limited to this application.

FIG. 3B shows an example of the configuration of the p-th character reception state transition table tid (p). The table id column includes an identifier identifying the table, and simultaneously records the access address xxxx to the table. The character i reception transition destination column (i=0, 1, . . . , F) includes a pointer to the (p+1)th character state transition table tid (p+1) to which the transition is performed when the contents of the p-th character of the key character string k-str are i. In the example shown in FIG. 3B, the pointer tid (p+1)=yyyy is entered in the character 0 reception transition destination column, and the (p+1)th character state transition table tid (p+1)=yyyy is linked. Although the character reception transition destination is null ( ), it indicates that the automaton am does not receive the key character string k-str of the p-th character 1. (That is, in the present embodiment, it is indicated that such a key character string k-str does not exist.)

The transition source table id column includes a pointer to the (p−1)th character state transition table tid (p−1), which is the transition source to the table, and is represented by wwww in the example shown in FIG. 3B. Although the root of the tree of the automaton am is the initial state transition table tid (0), it is obvious that the transition source table id column in the initial state transition table tid (0) is null ( ).

The final transition state flag column contains a flag indicating existence of the record having the key character string k-str using the table as the final transition state. If the value of the column is 0, there is no record using the table as the final transition state. According to the present embodiment, the final transition state flag is also used as a received record number counter. That is, the value in the final transition state flag column indicates the number of records of the key character string k-str using the table as the final transition state. In the example shown in FIG. 3B, 18 records are received using the table as the final transition state. That is, 18 different records have the same key character string k-str.

A received record identifier list column indicates the list of the record identifiers rid of the 18 records. In addition, a received record auxiliary information column includes the auxiliary information about the 18 records corresponding to the list of the received record identifier list columns. The auxiliary information refers to relevant information about the starting address, the record length of a corresponding record, etc.

Described below is an example of the data sort apparatus using the above mentioned automaton am.

FIG. 2 shows the configuration of the data sort apparatus. As shown in FIG. 2, the data sort apparatus is externally provided with data d and a key condition kc, and starts its operation. The data d is a data set containing a number of records, and the key condition kc specifies the condition of the key item in sorting records of the data d. An example of setting the structure and the key condition kc of the data d is shown in FIG. 4 and described below.

FIG. 4A shows an example of the structure of data d. As shown in FIG. 4A, the data d is represented in the text format in which a tag character string <R-END> forms the record structure, and an item is identified and delimited by a tag character string enclosed in inequality signs in the record. In the example shown in FIG. 4A, a record is formed by the data comprising four items, that is, a part code, a name, the fiscal year in which a person joined the company, and the sales. In this example, there is no record identifier rid identifying each record in the data. In FIG. 4A, the first record is defined as a record identifier rid=1, the second record is defined as a record identifier rid=2, . . . , and the last record is defined as a record identifier rid=Rmax, thus forming data comprising a total of Rmax records.

FIG. 4B shows an example of setting a key condition kc. The key condition kc sets a key priority, a key item name, a sort mode, a data type, and the maximum number of characters. The key priority is a priority assigned to each key item when a plurality of key items are set. In the example shown in FIG. 4B, three key items <sales>, <fiscal year in which a person joined the company>, and <part code> are set in this order of priority. The sort mode specifies ascending/descending order. In the example shown in FIG. 4B, descending order is specified for the <sales>, and ascending order is specified for the others.

The data type can be a number type and a character type. The character type data simply specifies the key item data as a character string. That is, the key character strings k-str can be obtained by segmenting a bit string of key item data in 4-bit units. For example, in the character string −123. 456 shown in FIG. 4C, the key character string k-str specifying it as a character string is formed by 16 characters X2D3132332E343536.

On the other hand, the number type specification requests the key item data character string indicating a number, and to compare data as a number in a sorting process. Therefore, the key data pre-processing unit 2 interprets a number indicated by the key item data character string, and converts it into a comparable key character string k-str in a standard character string. Since the numbers can be represented as zero-suppressed numbers, with a decimal point, with a positive/negative sign, for argument index representation, with a space inserted, with full and half size characters mixed, etc., the key data pre-processing unit 2 interprets and converts them into standard internal character strings.

The internal character string conversion specification for the number type is represented in a 4-byte (32-bit) floating point format, and is formed by a 1-bit sign portion, an 8-bit index portion, that is, a 1-bit index sign portion and a 7-bit index absolute value, an argument portion having a 23-bit argument integer. In a sign portion and an index sign portion 0 indicates a negative and 1 indicates a positive. For example, when a number type is specified, the character string −123. 456 shown in FIG. 4C is x4181E240 of an 8-character string in key character string k-str. It is different from the floating point format of the common ANSI/IEEE standard 754, but reflects the collating sequence of a number of the bit sequence of the 4-byte and 8-character key character string k-str.

When the maximum number of characters is set as a key condition kc, a sorting process is specified with an excess character string that is ignored if the key item data exceeds the maximum number of characters. The maximum number of characters refers to the number of characters as data, and does not refer to the number of characters of a key character string k-str. As described above, each setting of a key condition kc can be set by default except a key item name, and can be changed by inputting a specified value.

Figure 5:
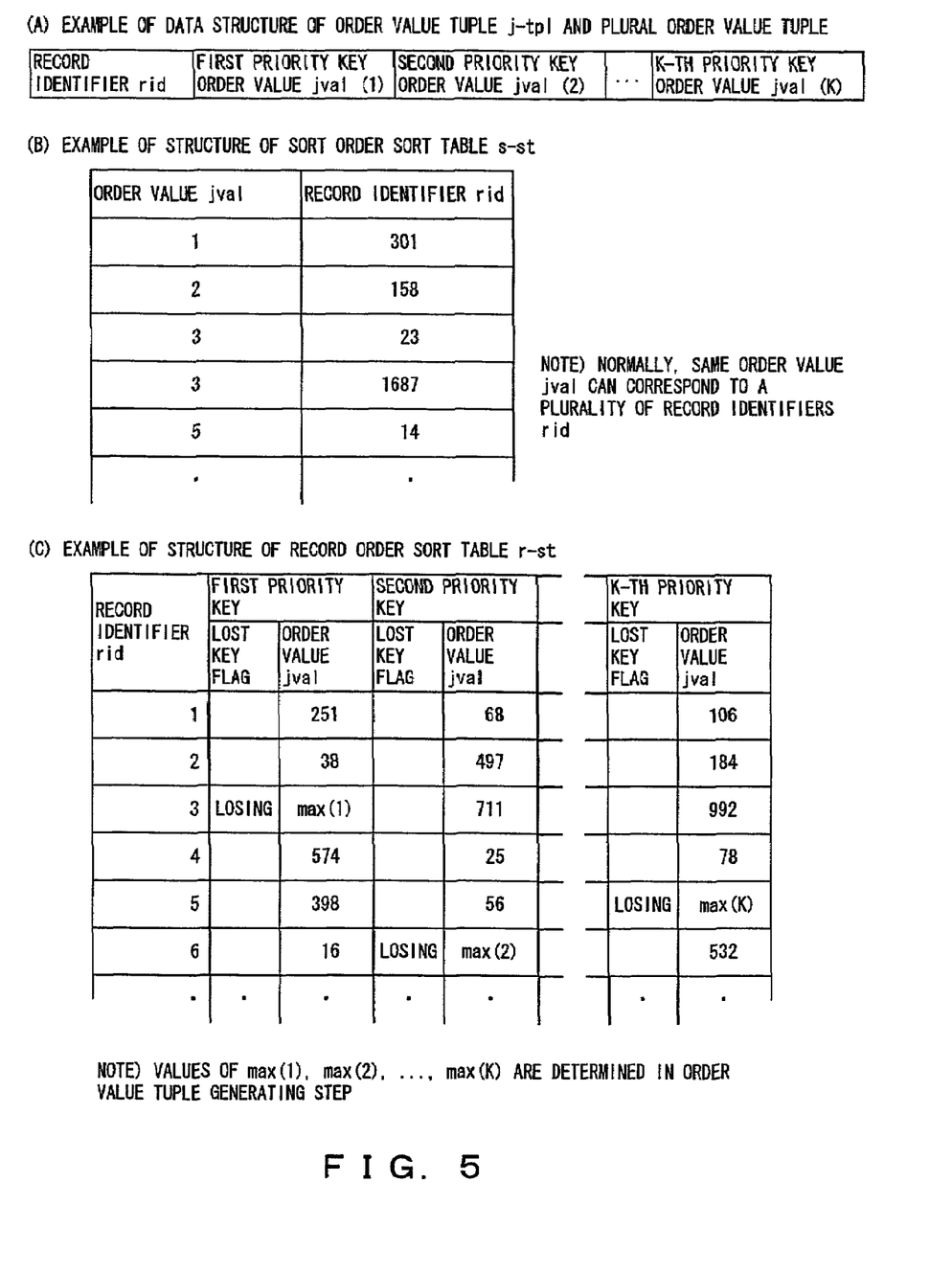
FIG. 5 shows an example of the data structure of a sort table.

Described below is a sort table. The data sort apparatus sequentially generates an order value tuple j-tpl, which is a set of a record identifier rid and an order value jval indicating the order of a sorting result of the record as described later, and accumulates them in a sort table. In this example, two sort tables, that is, a sort order sort table s-st and a record order sort table r-st, are included, and an example of the structure is shown in FIG. 5.

FIG. 5A shows the structure of the order value tuple j-tpl. The order value jval is also referred to as a plurality of order value tuples because it is generated for each key item when there are a plurality of specified sort key items. Since a set of order values jval (k) (k=1, 2, . . . , K) in a key specified as the k-th priority key by the key condition kc corresponds to a record identifier rid, the order value tuple j-tpl as shown in FIG. 5A can be obtained. Such data is accumulated in ascending order of order values jval with a specified order value jval remarked as the sort order sort table s-st shown in FIG. 5B. Normally, the same order value jval can correspond to a plurality of record identifiers rid as shown in FIG. 5B. That is, a plurality of records appear having the same order values, that is, without arranging them in any order.

FIG. 5C shows an example of the structure of the record order sort table r-st. It is a table on which a plurality of order value tuples as shown FIG. 5A are accumulated in ascending order of record identifiers rid. In the present embodiment, the row of each record identifier rid has a lost key flag column corresponding to an order value jval column. A lost key indicates that no specified key item exists when a specified key of a corresponding record is searched for, or that the item exists, but the item data is a null value. The details are described later, but when a lost key check is carried out in the data sort apparatus according to the present invention and a lost key is detected, a lost flag is set in the lost key flag column of the record order sort table r-st. In FIG. 5C, a lost key flag is set in the lost key flag column for the first priority key of the record identifier rid=3 and the second priority key of the record identifier rid=6, etc.

Various implementations can be prepared to solve the problem of the above mentioned lost key. According to the present embodiment, the record is assumed to have the largest order value jval of the key. That is, regardless of ascending or descending order, these records are assumed to be sorted in the lowest order. In FIG. 5C, the lowest order value jval is represented as max (k), but the value is determined in the order value tuple generating step as described later.

Figure 6:
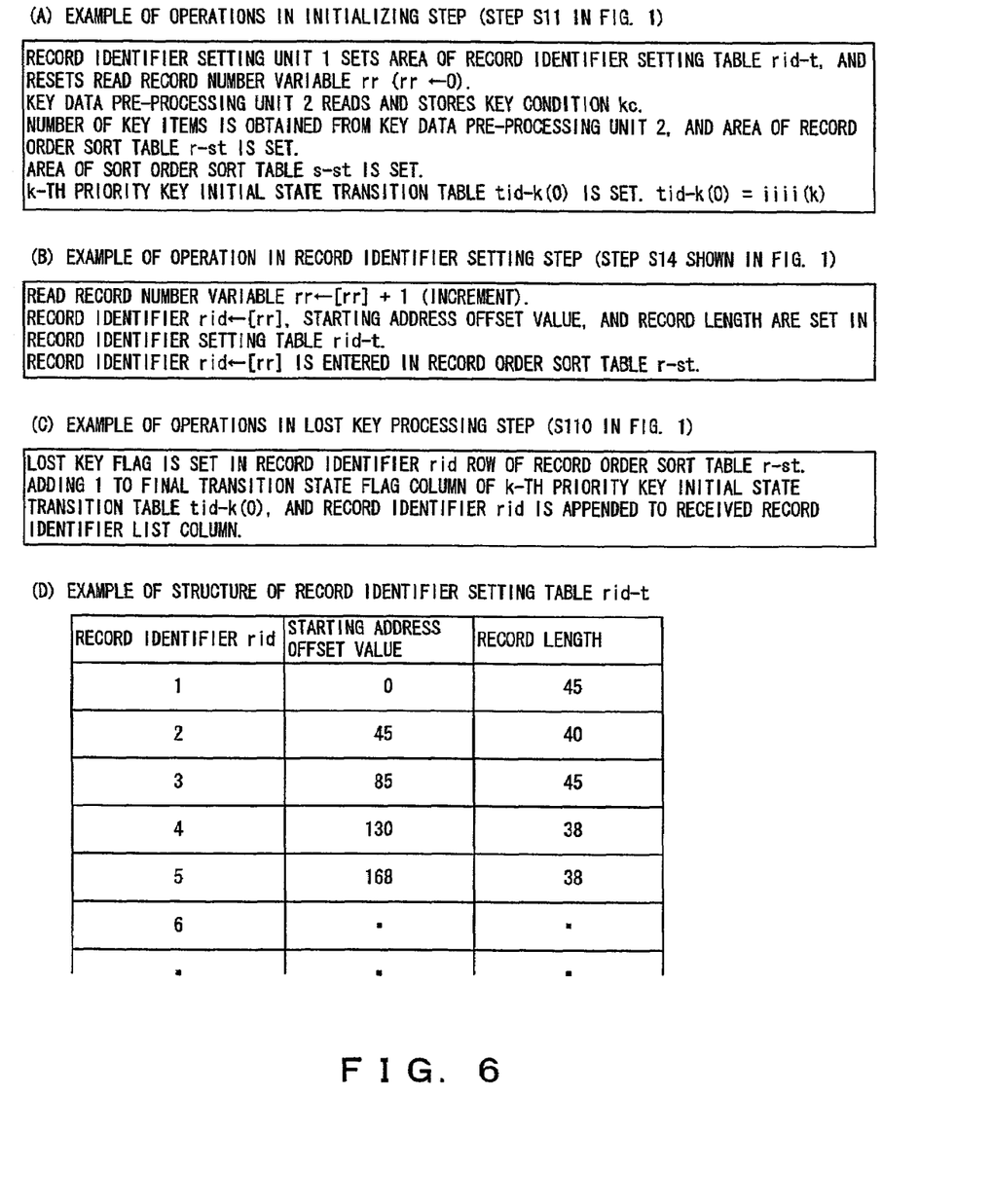
FIG. 6 shows an example of an operation of preparing for the generation of an automaton, and an example of the structure of a record identifier setting table rid-t.

With the above mentioned information taken into account, the operations of the data sort apparatus according to the present invention are described below by referring to the flowchart of the operations shown in FIGS. 1, 6, 7, 8, and 9. FIG. 1 shows an example of a flowchart of the operations performed in the data sort method according to the present invention. The process in step S113 is an initializing step, and FIG. 6A shows the detailed operations.

First, the record identifier setting unit 1 sets an area of a record identifier setting table rid-t shown in FIG. 6D. Then, the record identifier setting unit 1 resets a read record number variable rr (rr←0). Based on the read record number variable rr, the record identifier setting unit 1 issues a record identifier rid corresponding to each record read by the unit in the record identifier setting step (step S14) described later. The key data pre-processing unit 2 reads and stores a key condition kc. Then, the record identifier setting unit 1 obtains the number of key items from the key data pre-processing unit 2, sets an area of the record order sort table r-st described above by referring to FIG. 5, and sets an area of the sort order sort table s-st. In this example, these areas are only reserved, and the values are all null-cleared. Then, the record identifier setting unit 1 generates a k-th priority key initial state transition table tid-k (0) (k=1, 2, . . . , K). When three key items are set as shown in FIG. 4B, K=3, and a first priority key initial state transition table tid-1 (0)=iiii (1), a second priority key initial state transition table tid-2 (0)=iiii (2), and a third priority key initial state transition table tid-3 (0)=iiii (3) are generated. iiii (k) is an address and a table id of each initial state transition table tid-k(0).

Then, the common control unit (not shown in FIG. 2) of the data sort apparatus reads one record of the data d in step S12 as shown FIG. 1. If the end of the file is not reached in step S13, the operation of the record identifier setting step is performed in step S14. In this example, as shown in FIG. 6B, the read record number variable rr is first incremented (rr←[rr]+1), the result is set in the record identifier rid column of the record identifier setting table rid-t shown in FIG. 6D (record identifier rid←[rr]), and the starting address offset value, and the record length is set. The record identifier setting table rid-t is used as an index to directly access the record by the record identifier rid.

Thus, since the record identifier rid for the record is set, the record identifier rid←[rr] is entered in a predetermined row of the record order sort table r-st whose area has already been set. Then, the processes in steps S15, 16, and 17 are a loop control to transfer to the process of the k-th priority key (k=1, 2, . . . , K). In step S18, the key data pre-processing unit 2 checks whether the k-th priority key exists in the record, or whether the key data is a null value. If a lost key is not detected, the key data pre-process is performed in step S19. This process is, as described above with reference to FIG. 4C, to convert key data into a key character string k-str based on the key condition kc of the k-th priority key. If a lost key is detected in step S18, control is passed to step S110, and the operation of the lost key processing step shown in FIG. 6C is performed.

In the operation, the key data pre-processing unit 2 first sets a lost key flag in the lost key flag column of the k-th priority key corresponding to the record identifier rid of the record order sort table r-st shown in FIG. 5C. Then, the final transition state flag column of the k-th priority key initial state transition table tid-k (0) is incremented by 1, and the record identifier rid is appended to the received record identifier list column. That is, a record including a lost key is sorted by entering it in the received record identifier list column of the initial state transition table tid-k (0) of the automaton am of the key.

Figure 7:
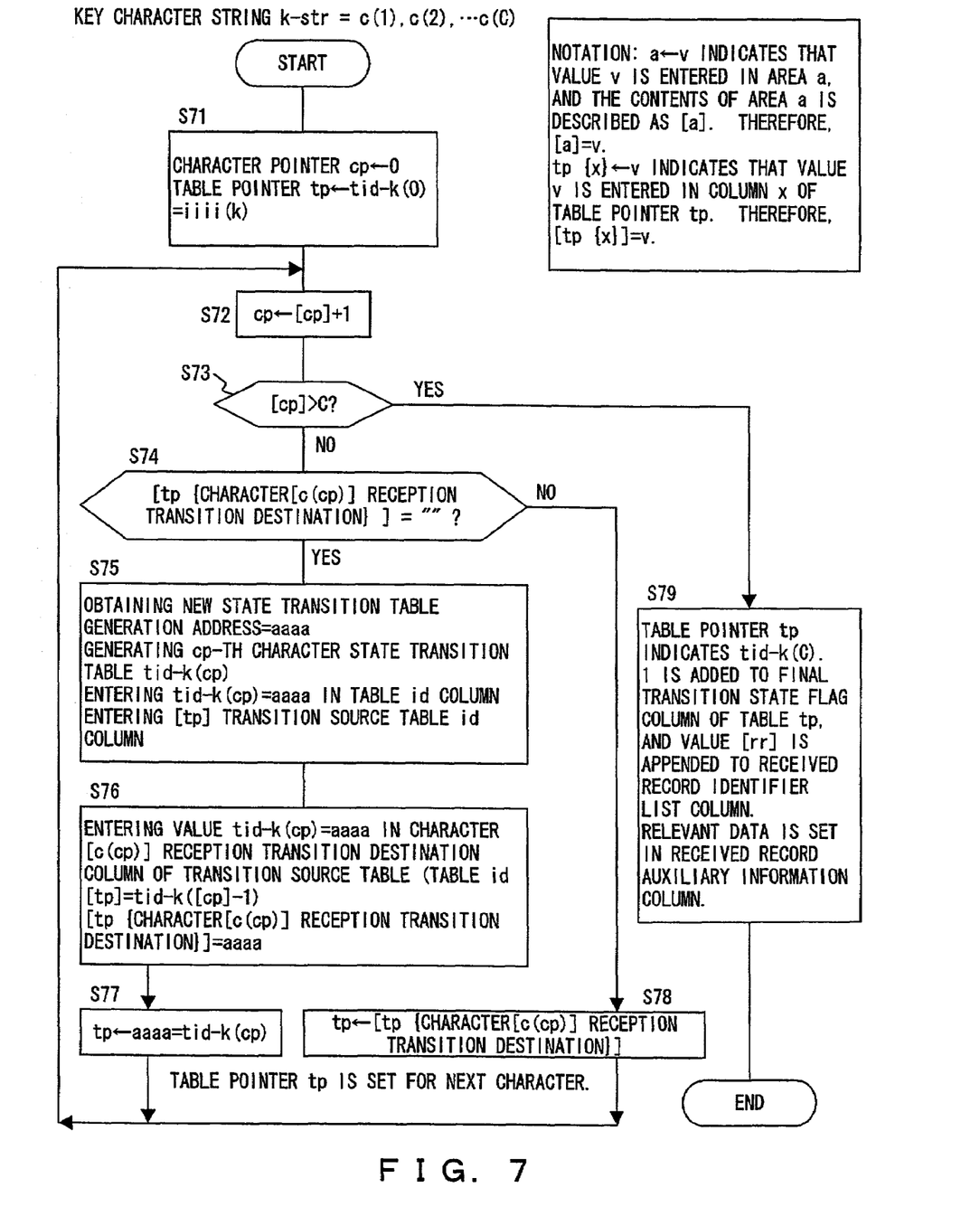
FIG. 7 shows an example of a flowchart of the operations of the automaton generating step.

Back in FIG. 1, when the key character string k-str is normally obtained, control is passed to step S111. In this step, the automaton generating unit 3 updates the automaton am corresponding to the k-th priority key as shown in FIG. 7. An example of an operation updated such that the automaton am can newly receive the key character string k-str=c (1), c (2), . . . , c (C) is explained with reference to FIG. 7.

First, in step S71, the automaton generating unit 3 resets the character pointer cp for retrieval of the key character string k-str of the k-th priority key, and sets the table pointer tp for retrieving the state transition table from the automaton am of the k-th priority key to point to the root of the automaton am (that is, the initial state transition table tid-k (0)). Then, in steps S72 and S73, the character pointer cp is advanced one step at a time to control the loop until the final character is reached. When the cp-th character c (cp) exists, control reaches step S74. When all characters are processed, control is branched to step S79. In step S74, the automaton generating unit 3 checks the code [c (cp)]=i of the character c (cp), and checks whether the character i reception transition destination column of the state transition table tp is null. If it is null, the key character string k-str has not been received yet. Therefore, a new state transition table is generated corresponding to the character string in step S75. That is, the automaton generating unit 3 obtains a new state transition table generation address=aaaa, generates the cp-th character state transition table tid-k (cp), and enters tid-k (cp)=aaaa in the id column of the table. Additionally, the original state transition table pointer value [tp] is entered in the transition source table id column. Correspondingly, the value tid-k (cp)=aaaa is entered in the character [c (cp)] reception transition destination column of the transition source table (table id [tp]=tid-k (table of [cp−1])) in step S76. It refers to rewriting the [tp{character[c (cp)] reception transition destination}] determined to be null in step S74 into the value aaaa.

Thus, since up to the c(cp)-th character in the key character string k-str has been received, the table pointer tp is advanced to the state transition table generated in step S75 to check the next character in step S77. On the other hand, if the [tp{character[c (cp)] reception transition destination}] is not null in step S74, there is a state transition table which has received the character, and the address of the state transition table is obtained. Therefore, in step S78, the automaton generating unit 3 sets the address as a table pointer tp.

In step S77 or S78, the table pointer tp is set for the next character, control is returned to step S72, the character pointer cp is advanced by one to process the next character. This operation is performed on all characters, and control is passed to step S79 when the operation is completed. At this point, the state transition table indicated by the value tid-k (C) of the table pointer tp shows the final transition state in which the key character string k-str is received. Therefore, the automaton generating unit 3 adds 1 to the value of the final transition state flag column of the table pointer tp in step S79, and appends the record identifier rid of the record having the received key character string k-str as the key data to the received record identifier list column. In addition, it sets relevant information in the received record auxiliary information column.

Back in FIG. 1, when the automaton generating step corresponding to the k-th priority key in step S111 is completed, control is returned to step S16, and the similar process is performed for the automaton am corresponding to the (k+1)th priority key. Thus, when K automatons am are generated or updated on all keys specified in the corresponding record, control exits the loop in step S17, and is returned to step S12, and the common control unit of the data sort apparatus reads the next record belonging to the data d.

Thus, if the record identifier is set and the automaton am is generated or updated on all records belonging to the data d, then an end of file is detected in step S13, the process on the common control unit of the data sort apparatus is branched to step S112, thereby reaching the step of scanning the automaton am generated and updated to this point. In steps S112 through S114, the loop control is performed on each k-th priority key, and the sort table generating unit 4 generates an order value tuple and a sort table corresponding to the k-th priority key in step S115. The operation is described below with reference to FIG. 8.

Figure 8:
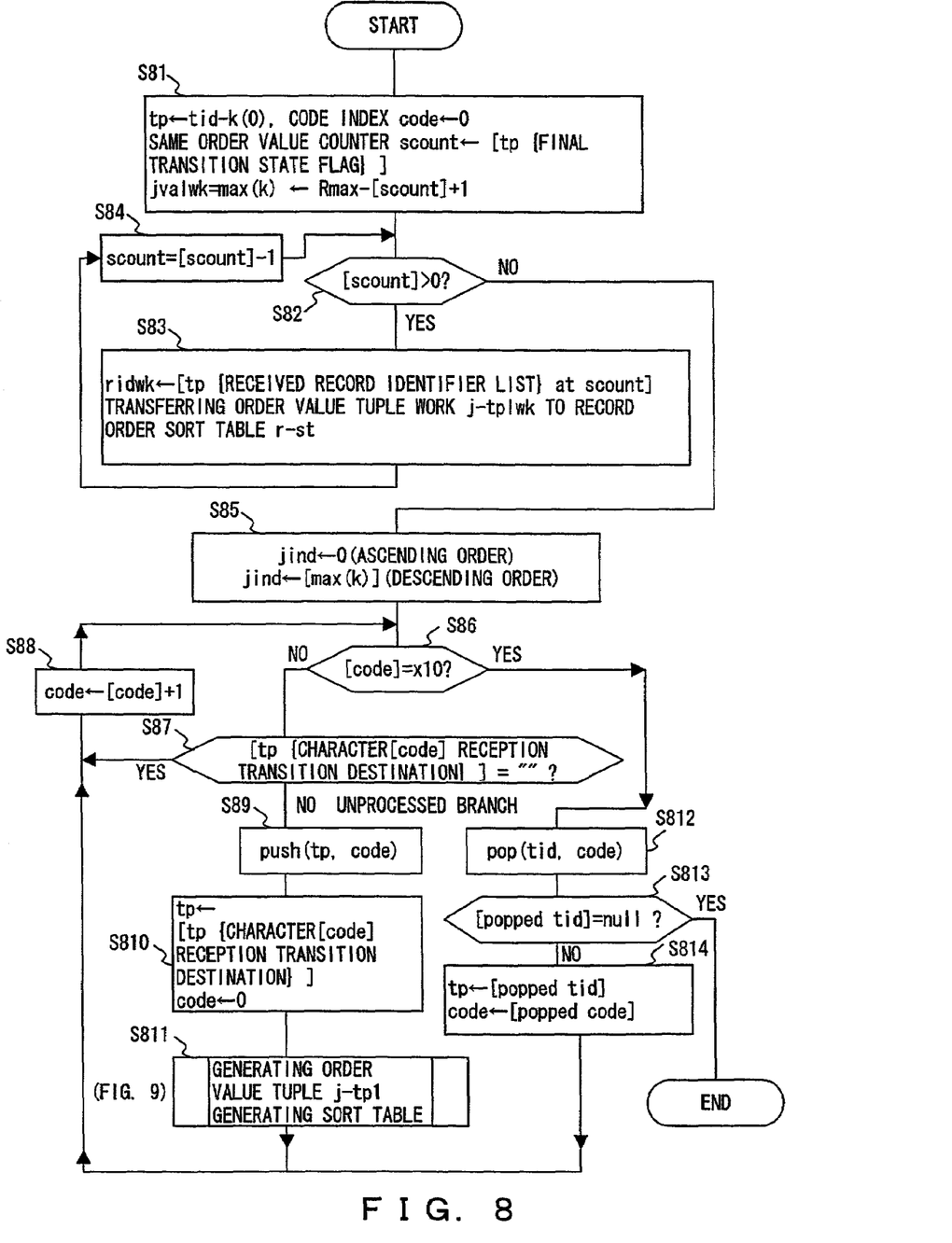
FIG. 8 shows an example of a flowchart of the operations of the sort table generating step.

In step S81 shown in FIG. 8, a record indicating a lost key described above is identified in the initialization for generation of the order value tuple. That is, the order value tuple generation unit 41 of the sort table generating unit 4 sets the table pointer tp in the initial state transition table tid-k (0)=iiii (k) of the k-th priority key automaton am (tp←tid-k (0)), and sets the code index code to 0 (code←0). (A code index code is described later.) Then, the value of the final transition state flag column of the initial state transition table tid-k (0)=iiii (k) is set in the same order value counters count (same order value counter scount←[{final transition state flag}]). Thus, it is clear that there are [scount] records lost by the k-th priority key. On the other hand, the value of the read record number variable rr is to indicate the total number of records Rmax. Thus, [rr]−[scount]=Rmax−[scount] records are to be scanned, and the lowest order value Rmax−[scount]+1 is to be provided for all order values jval of the records having a lost key.

The order value tuple generation unit 41 uses an area order value tuple work j-tplwk formed by a record identifier work ridwk and an order value work jvalwk to generate an order value tuple j-tpl. In step S81, Rmax−[scount]+1, which is an order value jval of a record having the lost key, is set in the order value work jvalwk (jvalwk=max (k)←Rmax−[scount]+1 in step S81 shown in FIG. 8). Simultaneously, since the value is max (k), described above with reference to FIG. 5C, the order value tuple generation unit 41 sets this value in the corresponding positions of the record order sort table r-st and the sort order sort table s-st in steps S82 through S84. In step S83, the [scount] record identifiers in the received record identifier list column of the initial state transition table tid-k (0)=iiii (k) are sequentially retrieved, and are substituted for the record identifier work ridwk, thereby completing the order value tuple work j-tplwk.

As described above, since the order value jval for the record having a lost key has been completed, the order value tuple generation unit 41 scans the automaton am corresponding to the k-th priority key in and after step S85, and associates the order value jval of the k-th priority key with each record identifier rid. At this time, the order value tuple generation unit 41 adopts the following strategy in and after step S85. That is, first, an order value index jind is used as an index variable for providing an order value jval. First, an initial value is set in the order value index jind. Then, all state transition tables linked, starting from the k-th priority key initial state transition table tid-k (0) of the automaton am, are scanned. At this time, the order value index jind is adjusted and set in ascending/descending order of the sort mode each time the state transition table to be accessed is advanced by one, and the value of the order value index jind is associated as the order value jval with the record identifier rid in the received record identifier list column of the corresponding state transition table. As it is clear from the strategy, the access order to the state transition table of the order value tuple generation unit 41 is to be the access order corresponding to the sorting order of the k-th priority key character string k-str.

Thus, considering the access order when the sorting order of the key character string k-str is ascending order, the state transition table corresponding to the key character string k-str having the smallest value of the first character c(1), that is, code 0, is selected. It is the first character state transition table tid-k (1) pointed to by the pointer of the character 0 reception transition destination column of the k-th priority key initial state transition table tid-k (0). If the final transition state flag column of the first character state transition table tid-k (1) is equal to or larger than 1, then it indicates the existence of a record having the key character strings k-str configured by one character of a code 0. (As described above, a character refers to a character unit of the key character string k-str. In the present embodiment, it is a 4-bit character. The existence of the assignment of a character in the actual character code system does not count.) Thus, the highest order value jval is associated with each record identifier rid entered in the received record identifier list column of the first character state transition table tid-k (1). The order value index jind is increased for the number of records to prepared for the next order value jval, and then the second character state transition table tid-k (2) entered in the character 0 reception transition destination column of the first character state transition table tid-k (1) is accessed.

Thus, the order value tuple generation unit 41 traces the tree structure of the automaton am by depth and by priority, and the maximum of 16 branches of the character 1 reception transition destination column from the character 0 reception transition destination column are scanned in this order. The table pointer tp is used to trace the state transition table by depth and by priority, and the code index code set in step S81 is used to trace the branch from the character 0 reception transition destination column to the character F reception transition destination column. When a scanning process is completed by depth and by priority by starting from the branch code of a state transition table (that is, a value of a character [code] reception transition destination), it is necessary to perform back track control by returning the branch code of the starting state transition table and transferring the scanning process to the next branch. To realize this, the order value tuple generation unit 41 uses a back track stack for stacking a set of a table pointer tp and a code index code to perform back track control. This stack is a last-in-first-out type stack, and has the structure of reading the last pushed value by a pop instruction.

The flowchart of the operation for realizing the above-described strategy is given below in and after step S85 shown in FIG. 8. In step S85, the order value tuple generation unit 41 initializes the order value index jind. The value of jind depends on the sort mode (ascending/descending) of the k-th priority key. If the scanning process is performed in the above-described strategy, and when the sort mode is in ascending order, then the order value index jind is incremented from the initial value 0. If the sort mode is in descending order, the order value index jind is decremented using the lowest order value [max (k)] as an initial value.

In the above mentioned step S81, the table pointer tp points to the k-th priority key initial state transition table tid-k (0), and the code index code indicates 0. Therefore, when step S86 is started, the character [code] reception transition destination column contained in the state transition table of the root of the automaton am is defined as a starting point. Normally, the character [code] reception transition destination column of the cp−1 character state transition table tid-k (cp−1) node is specified, and control is passed to step S86. If the code index code has not reached x10, that is, the code index code is 0~F, then it is checked in step S87 whether the character [code] reception transition destination column of the state transition table has the next link destination. If not, the code index code is incremented in step S88. If it is determined in step S87 that there is a link destination, then the order value tuple generation unit 41 first pushes the current table pointer tp and the code index code for a back track stack in step S89, newly sets [tp{character [code] reception transition destination}], which is the link destination, in the table pointer tp, and control is branched to the order value tuple generating and sort table generating routines in step S811. The routine is described later with reference to FIG. 9.

If the target order value tuple j-tpl and sort table are generated and updated in step S811, then the code index code is incremented in step S88 to trace the branch on the state transition table, and it is determined in step S86 whether there is an unprocessed branch. If the code index code has reached x10, then there is no further branches, the processes on the state transition table are completed, and the next branch destination is popped from the back track stack in step S812. Thus, the last pushed table pointer tp and the position of the code index code can be retrieved.

In step S813, if the check result indicates that there is no popped table pointer tp, that is, the final stack has been processed and the entire back track process has been completed, then the entire process terminates. If there are the popped table pointer tp and the code index code, then the order value tuple generation unit 41 processes the next branch on the state transition table based on them in step S814, and control is returned to step S88, thereby continuing the process.

Finally, the operation of obtaining the order value tuple j-tpl and updating the sort table in step SB11 is described below with reference to FIG. 9. The order value tuple generating and sort table generating routine is called by inputting an order value index jind, a sort mode flag sm (k), and a table pointer tp, and updates as output the order value tuple j-tpl (provided as the order value tuple work j-tplwk), and the row of the record identifier rid of the record order sort table r-st shown in FIG. 5C. Furthermore, the sort order sort table s-st shown in FIG. 5B is generated as necessary. For example, if K=1, that is, the number of keys is 1, then the target sorting operation can be performed only by generating the sort order sort table s-st. In this case, the generation of the record order sort table r-st can be omitted. In addition, the present routine issues a predetermined order value jval using the input order value index jind, and finally updates and outputs the order value index jind for use in the next scanning operation.

Figure 9:
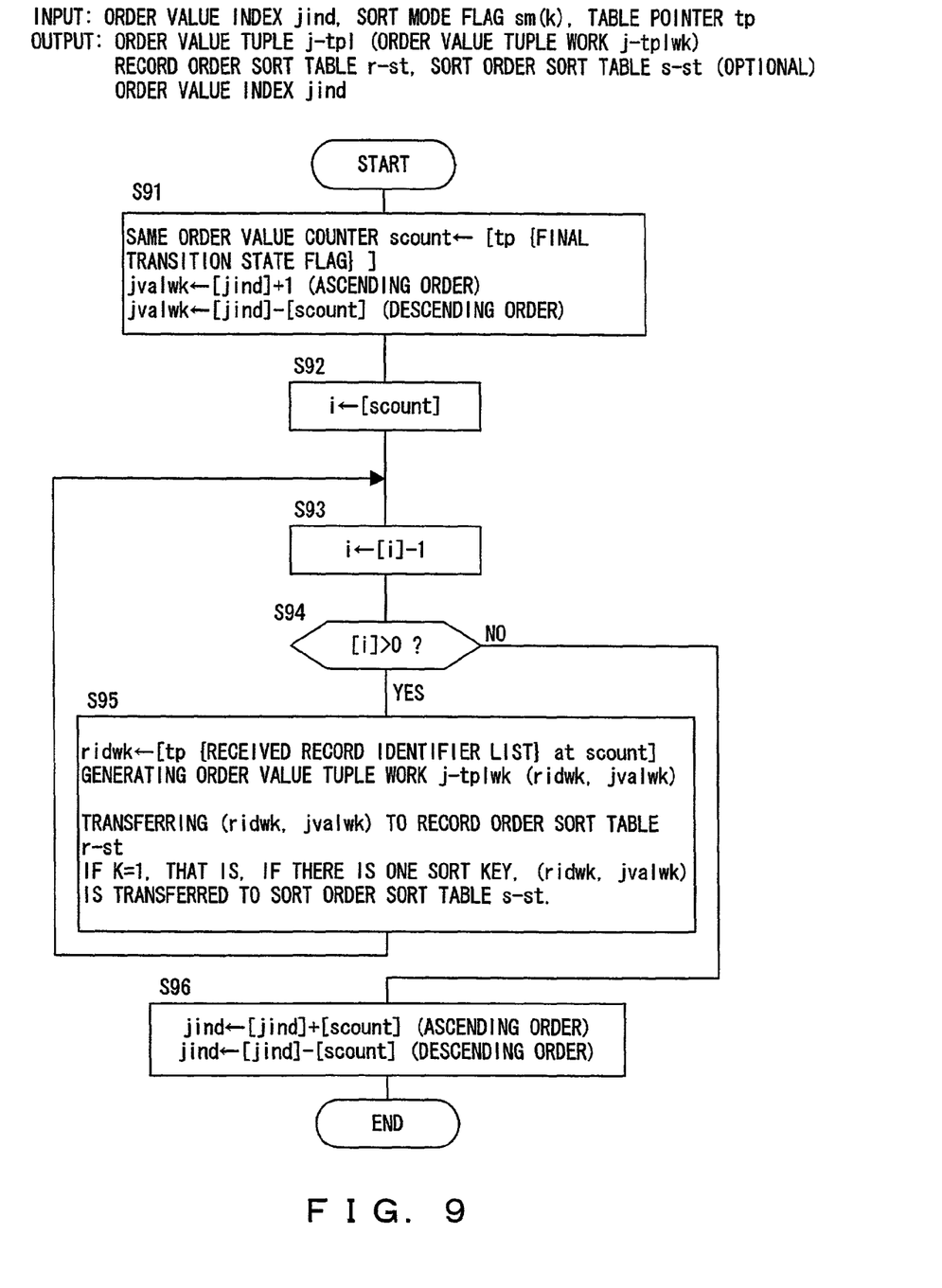
FIG. 9 shows an example of the operations of the order value tuple j-tpl generation and the sort table generation routines.

In step S91 shown in FIG. 9, the final transition state flag column of a specified state transition table tp is referred to so that the number of record identifiers rid for which the order value jval is to be issued can be obtained, and the number is set in the same order value counter scount. When the sort mode flag sm (k) is set in ascending order, the order value jval is to be issued from the value of the order value index jind+1. Therefore, the order value work jvalwk is set to the value of the order value index jind+1. On the other hand, when the sort mode flag Sm (k) is set in descending order, the same order value jval is issued to the amount of [scount], and the next lower order is to be assigned the value of the current order value index jind. Therefore, the value of the order value jval to be issued is [jind]−[scount], and the order value work jvalwk is set to [jind]−[scount].

Then, the order value tuple generation unit 41 performs the loop-controlling process for the amount of [scount] in steps S92 through S94, and obtains the record identifier work ridwk corresponding to the order value work jvalwk in step S95. That is, since corresponding [scount] record identifiers rid are written in the received record identifier list column of the state transition table tp, the same order value work jvalwk corresponds to all these record identifiers rid. Thus, a corresponding record identifier rid is set for the record identifier work ridwk to generate the order value tuple work j-tplwk (ridwk, jvalwk). Simultaneously, the value of the order value work jvalwk is transferred to the cell of the K-th priority key order value jval column of the corresponding record identifier rid row. Thus, the record order sort table r-st is updated. Furthermore, if K=1, that is, if there is one sort key, (ridwk, jvalwk) is transferred to the sort order sort table s-st as well as the record order sort table r-st, thereby performing the target sorting operation. That is, if there is one key and ascending order is specified, then the sort order sort table s-st is filled from a higher order of the order value jval as the order value tuple generating operation as shown in FIG. 8. For example, when 20 higher order record identifiers rid are obtained, the purpose of the sorting operation can be attained during the update of the sort order sort table s-st although all the state transition tables of the automaton am are not completely scanned, thereby obtaining a process result at a higher speed than in the conventional data sorting technology.

As described above, when the order value tuple generating and sort table generating and updating are performed, order value index jind is updated in preparation for the next process in step S96. In this example, since [scount] processes are performed, the value of the order value index jind is updated to [jind]+[scount] when ascending order is specified for the sort mode flag sm (k), and to [jind]−[scount] when descending order is specified. As described above, when K sort keys are specified, the record order sort table r-st shown in FIG. 5C is formed according to the present embodiment. Corresponding to each record identifier rid, all cells from the first priority key order value jval to the K-th priority key order value jval are filled with the order values jval. In the record order sort table r-st, it is necessary that the record identifier rid having the general order value, that is, the record identifier rid having the equal order value jval of the first priority key order value jval is arranged in ascending order of the order value jval of the second priority key, the record identifier rid having the equal order values jval of the first to second priority key order values jval are arranged in ascending order of the order value jval of the third priority key, . . . , and the record identifier rid having the equal order values jval of the first to (k−1)th priority key order values jval are arranged in ascending order of the order value jval of the K-th priority key, thereby assigning general order values of record identifiers rid. A set of the general order value and the record identifier, that is, a general order value tuple, is generated in the order value tuple generating step described below.

This step is performed by providing the generated record order sort table r-st as data d in the data sort apparatus shown in FIG. 2. That is, since each record identifier rid of the record order sort table r-st shown in FIG. 5C has a row of a plurality of order values configured by the first priority key order value jval, the second priority key order value jval, . . . , the K-th priority key order value jval, a row of the plurality of order values is replaced with one character string which is referred to as a character string belonging to the record identifier, and the character string is provided for the data sort apparatus shown in FIG. 2 relating to all tuples on the record order sort table as a plural order value key character string fjk. The general order values are arranged in ascending order of the plural order value key character string fjk. Therefore, in the operation of the data sort apparatus, with a key number of 1 and the key item of a plural order value key character string fjk, the sort order sort table s-st obtained in the operation in step S95 is a table on which record identifiers rid are arranged in the order of the general order values, thereby obtaining a predetermined result.

The processes in the embodiments of the present invention are performed in the main storage device of a computer through a computer program, but the format of the computer program is provided as stored in an auxiliary storage device connected to the computer, a portable storage device such as a floppy disk, CD-ROM, etc., each storage medium such as a main storage device, an auxiliary storage device, etc., of another computer connected to the network. When the computer program is executed, it is loaded into the main storage device of the computer.

As described above, according to the present invention, an automaton for receiving a character string of a sort key item of each record is generated, the record identifier is associated with the final transition state, and the automaton is scanned, thereby realizing a high speed data sorting operation in the conventional data sort method.

Additionally, the present invention can be realized in various other embodiments without departing from the spirit and the main feature of the present invention. Therefore, the above mentioned embodiments are only examples in various respects, and the present invention is not limited to these embodiments. The scope of the present invention is described in the range of the claims, and is not limited to the body of the specification. Furthermore, the variations and amendments to the scope of the claims are in the range of the present invention.

What is claimed is:

1. A data sort method of rearranging records according to a specified sort key item in an ascending/descending order, comprising:
    an automaton generating step of generating, in a main memory, an automaton which receives a character string of a sort key item of each record read successively from outside, and which is a set of state transition tables with a hierarchical tree structure whose hierarchical depth is equal to a maximum number of characters of a character string of a sort key item of each record, and whose transition table corresponds to each character of a character string of the sort key item of each record, and also whose state transition table contains links to next stage state transition tables each of which corresponds to a next character of a character string of the sort key item of each record in an ascending/descending order according to each of the next characters, and which associates a record identifier of each record with a final state transition table corresponding to the final character of a character string of the sort key item of the record; and
    an order value tuple generating step of generating an order value tuple which is a set of a record identifier of the record and an order value which is obtained by arranging the records in an ascending/descending order by scanning the automaton in order of contained links in the state transition tables giving priority to the depth direction of the hierarchy of the state transition tables.

2. The data sort method according to claim 1, wherein there are a plurality of sort key items, and said order value tuple is a set of a plurality of order values and a record identifier.

3. The data sort method according to claim 2, further comprising:
    a sort table generating step of generating a sort table on which the order value tuples are arranged in a predetermined order.

4. The data sort method according to claim 1, further comprising:
    a sort table generating step of generating a sort table on which the order value tuples are arranged in a predetermined order.

5. The data sort method according to claim 4, wherein
    in said sort table generating step, a sort order sort table on which order values are arranged in an ascending or descending order is generated.

6. The data sort method according to claim 4, wherein
    in said sort table generating step, a record order sort table on which record identifiers are arranged in an ascending or descending order is generated.

7. The data sort method according to claim 6, wherein
    there are a plurality of sort key items, and a record order sort table is generated based on a plurality of order value tuples which is a set of a plurality of order values and a record identifier, and further comprising:
    an automaton generating step of generating an automaton for assuming that a row of a plurality of order values of the record order sort table is a character string belonging to the record identifier, and receiving the character string as a plural order value key character string for all tuples on the record order sort table; and
    a general order value tuple generating step of scanning the automaton, and generating a general order value tuple which is a set of the record identifier and a newly ordered general order value as a general order for the plurality of sort keys.

8. The data sort method according to claim 1, further comprising:
    a record identifier setting step of recording a tuple for association between a starting address of a record and a record identifier for identification of the record for each record read from input data.

9. The data sort method according to claim 1, further comprising:
    a key data preprocessing step of converting input sort key item data into a key character string appropriate for said automaton generating step according to a key condition relating to a sort method for each specified sort key item.

10. A data sort apparatus which rearranges records according to a specified sort key item in an ascending/descending order, comprising:
    an automaton generating unit generating, in a main memory, an automaton which receives a character string of a sort key item of each record read successively from outside, and which is a set of state transition tables with a hierarchical tree structure whose hierarchical depth is equal to a maximum number of characters of a character string of a sort key item of each record, and whose transition table corresponds to each character of a character string of the sort key item of each record, and also whose state transition table contains links to next stage state transition tables each of which corresponds to a next character of a character string of the sort key item of each record in an ascending/descending order according to each of the next characters, and which associates a record identifier of each record with a final state transition table corresponding to the final character of a character string of the sort key item of the record; and an order value tuple generating unit generating an order value tuple which is a set of a record identifier of the record and an order value which is obtained by arranging the records in an ascending/descending order by scanning the automaton in order of contained links in the state transition tables giving priority to the depth direction of the hierarchy of the state transition tables.

11. A data sort program for directing a computer to perform a data sorting process of rearranging records according to a specified sort key item in an ascending/descending order, comprising:

an automaton generating step of generating, in a main memory, an automaton which receives a character string of a sort key item of each record read successively from outside, and which is a set of state transition tables with a hierarchical tree structure whose hierarchical depth is equal to a maximum number of characters of a character string of a sort key item of each record, and whose transition table corresponds to each character of a character string of the sort key item of each record, and also whose state transition table contains links to next stage state transition tables each of which corresponds to a next character of a character string of the sort key item of each record in an ascending/descending order according to each of the next characters, and which associates, a record identifier of each record with a final state transition table corresponding to the final character of a character string of the sort key item of the record; and an order value tuple generating step of generating an order value tuple which is a set of a record identifier of the record and an order value which is obtained by arranging the records in an ascending/descending order by scanning the automaton in order of contained links in the state transition tables giving priority to the depth direction of the hierarchy of the state transition tables.

12. A computer-readable storage medium storing the program according to claim 11.

13. A data sort apparatus which rearranges records according to a specified sort key item in an ascending/descending order, comprising:

automaton generating means for generating, in a main memory, an automaton which receives a character string of a sort key item of each record read successively from outside, and which is a set of state transition tables with a hierarchical tree structure whose hierarchical depth is equal to a maximum number of characters of a character string of the sort key item of each record, and whose transition table corresponds to each character of a character string of the sort key item of each record, and also whose state transition table contains links to next stage state transition tables each of which corresponds to a next character of a character string of the sort key item of each record in an ascending/descending order according to each of the next characters, and which associates a record identifier of each record with a final state transition table corresponding to the final character of a character string of a sort key item of the record; and order value tuple generating means for generating an order value tuple which is a set of a record identifier of the record and an order value which is obtained by arranging the records in an ascending/descending order by scanning the automaton in order of contained links in the state transition tables giving priority to the depth direction of the hierarchy of the state transition tables.

* * * * *

UNITED STATES PATENT AND TRADEMARK OFFICE
CERTIFICATE OF CORRECTION

PATENT NO. : 7,103,596 B2  Page 1 of 1
APPLICATION NO. : 10/086696
DATED : September 5, 2006
INVENTOR(S) : Fumirou Abe et al.

It is certified that error appears in the above-identified patent and that said Letters Patent is hereby corrected as shown below:

Title Page (56) Column 2 (Other Publications), Line 5, Below "pp. 409-454" insert -- Office Action for corresponding European Application No. 02 251 763.5 dated April 12, 2006.--

Signed and Sealed this

Ninth Day of January, 2007

JON W. DUDAS
*Director of the United States Patent and Trademark Office*